(12) United States Patent
Huens et al.

(10) Patent No.: US 6,398,939 B1
(45) Date of Patent: Jun. 4, 2002

(54) METHOD AND APPARATUS FOR CONTROLLING FLOW IN AN ELECTRODEPOSITION PROCESS

(75) Inventors: Jean-Louis Huens, Tucson, AZ (US); Peter Peckham, Painesville, OH (US)

(73) Assignee: Phelps Dodge Corporation, Phoenix, AZ (US)

( * ) Notice: Subject to any disclaimer, the term of this patent is extended or adjusted under 35 U.S.C. 154(b) by 0 days.

(21) Appl. No.: 09/802,656

(22) Filed: Mar. 9, 2001

(51) Int. Cl.[7] .............................. C25C 1/12; C25C 7/00; C25B 15/00
(52) U.S. Cl. .................. 205/574; 204/269; 204/273; 204/237; 204/278.5
(58) Field of Search ................................ 204/269, 273, 204/278.5, 237; 205/574

(56) References Cited

U.S. PATENT DOCUMENTS

| | | | |
|---|---|---|---|
| 4,279,732 A | 7/1981 | Bellows et al. | 204/269 |
| 4,285,794 A | 8/1981 | Bellows et al. | 204/260 |
| 4,330,386 A | 3/1982 | Korinek et al. | 204/223 |
| 4,435,258 A | 3/1984 | Melka, Jr. et al. | 204/109 |
| 4,608,136 A | 8/1986 | Vaughan et al. | 204/106 |
| 4,636,274 A | 1/1987 | Gruver et al. | 156/279 |
| 4,789,439 A | 12/1988 | Bunk et al. | 204/28 |
| 5,082,538 A | 1/1992 | DeRespiris et al. | 205/140 |
| 5,183,544 A | 2/1993 | Weber et al. | 204/252 |
| 5,248,398 A | 9/1993 | Cordani | 204/106 |
| 5,470,445 A | 11/1995 | Murray et al. | 204/105 R |
| 5,855,749 A | 1/1999 | Kohut et al. | 204/470 |

*Primary Examiner*—Donald R. Valentine
*Assistant Examiner*—Thomas H. Parsons
(74) *Attorney, Agent, or Firm*—Mark Kusner; Michael A. Jaffe

(57) ABSTRACT

An electrowinning cell, having a tank with an opened upper end defined by a tank edge, electrolyte within the tank and a plurality of flat, metallic electrode plates disposed within the tank in side-by-side, spaced-apart, parallel relationship. Adjacent electrode plates define an electrode gap therebetween. An injector manifold is disposed at the bottom of the tank for feeding electrolyte into the tank at locations below the electrode plates. A collector grid, comprised of a plurality of collectors having ports, define an upper level of electrolyte by collecting the electrolyte from the tank. The ports are disposed in spaced-apart relationship within the open upper end defined by the tank edge. The collector grid and the injector creating a flow of electrolyte upward between the plates as the electrolyte flows from the manifold locations below the plates to the ports.

28 Claims, 11 Drawing Sheets

METHOD AND APPARATUS FOR CONTROLLING FLOW IN AN ELECTRODEPOSITION PROCESS

BACKGROUND OF THE INVENTION

1. Field of the Invention

The present invention relates generally to the electrodeposition of metal, and more particularly, to an electrowinning cell and an electrolyte flow system therefor. While the present invention is particularly applicable to an electrowinning process for forming copper, and will be described with reference thereto, the invention also finds advantageous application in electrodepositing other types of metals and metal compounds.

2. Description of the Related Art

It is well known that metal can be extracted from metal ions in an electrolytic solution through an electrowinning process. An electrowinning process utilizes the known technique of plating metal or metal compounds out of an electrolytic solution onto an electrode plate. Modern electrowinning typically occurs in a relatively large, non-conductive tank that contains metal ions dissolved in an electrolytic solution. A plurality of side-by-side, parallel cathode and anode plates are suspended in the electrolytic solution. In a copper electrowinning cell, the cathodes and the anodes are ultimately arranged such that each cathode is disposed between two anodes. The cathodes and anodes are connected to an electrical power source to cause the plating of copper onto the cathode plates.

Electrowinning cells typically include a circulating system that circulates the electrolytic solution from a reservoir to the electrowinning cell and back to the reservoir. Metal ions depleted from the electrolytic solution during the electrodeposition process, are replenished in the reservoir. The replenished (i.e., "fresh") electrolytic solution is pumped into the electrowinning tank, typically at the bottom thereof. Excess solution in the tank overflows the upper edge of the tank and is collected in a trough. The collected (i.e., "metal depleted") electrolyte is returned to the reservoir.

This type of arrangement produces a less than desirable flow of the electrolytic solution in the tank. The electrolytic solution typically flows from its point of entry at the bottom of the tank toward the edge of the tank where the solution exits, i.e., overflows, the tank. This produces areas of lower flow between the plates, that is more marked in the middle of the upper region of the tank. The flow of the electrolytic solution is also influenced by gas bubbles that form between the electrode plates during the electrodeposition process, as gas is liberated at the surface of the anode plates. These gas bubbles also tend to direct the electrolytic solution away from the spaces or gaps between the parallel anode and cathode plates toward the sides and edges of the tank. Thus, the replenished, fresh electrolytic solution forced into the tank typically flows toward the edges of the tank where it overflows the tank, rather than into the cathode and anode gaps where the actual electrodeposition occurs and where the replenished electrolytic solution is needed.

The present invention overcomes these and other problems and provides an electrowinning cell and a circulation system therefor, wherein fresh electrolytic solution entering the tank is directed more uniformly between the cathode and the anode plates.

SUMMARY OF THE INVENTION

In accordance with the present invention, there is provided an electrowinning cell that is comprised of a tank for holding electrolyte. The tank has an opened upper end. A plurality of flat, metallic electrode plates are disposed within the tank in side-by-side, spaced-apart, parallel relationship, the electrode plates defining a gap between adjacent electrode plates. An electrolyte circulation system includes an inlet manifold disposed below the electrode plates, and a plurality of spaced-apart collectors extending across the open upper end of the tank. The collectors extend parallel to the electrode plates. Electrolyte is continuously pumped into the tank through the inlet manifold. The electrolyte pumped into the tank flows upward through the gaps to the collectors, the collectors establishing a level for the electrolyte in the tank.

In accordance with another aspect of the present invention, there is provided an electrowinning cell, having a tank, electrolyte within the tank and a plurality of flat, metallic electrode plates disposed within the tank in side-by-side, spaced-apart, parallel relationship. Adjacent electrode plates define an electrode gap therebetween. An electrolyte feed line is provided for injecting electrolyte into the tank below the lower portions of the electrode plates. An electrolyte collector grid comprised of a plurality of generally parallel collectors that extend across the tank are disposed between the electrode plates and establish a level of electrolyte in the tank by collecting the electrolyte when the electrolyte reaches the level. The collectors are disposed relative to the inlet feed line to collect the electrolyte solution at spaced-apart locations within the tank and -to produce a generally vertical flow of electrolyte through the gaps between the electrode plates.

In accordance with another aspect of the present invention, there is provided an electrowinning cell, having a tank having an opened upper end defined by a tank edge, electrolyte within the tank and a plurality of flat, metallic electrode plates disposed within the tank in side-by-side, spaced-apart, parallel relationship. Adjacent electrode plates define an electrode gap therebetween. An injector manifold is disposed at the bottom of the tank for feeding electrolyte into the tank at locations below the electrode plates. An electrolyte collector grid comprised of a plurality of collector ports defines an upper level of the electrolyte by collecting the electrolyte from the tank. The ports are disposed in spaced-apart relationship across the open upper end of the tank. The collector grid and the injector create a flow of the electrolyte upward between the plates as the solution flows from the manifold locations below the plates to the collector ports.

In accordance with another aspect of the present invention, there is provided a method of electrowinning copper, comprising the steps of:

(a) vertically orienting a cathode plate between two, spaced-apart, vertical anode plates within a tank, the cathode plate and the anode plates being essentially parallel to each other with a uniform gap defined between the cathode plate and each anode plate;

(b) negatively energizing the cathode plate and positively energizing the anode plates; and (c) causing a vertical, upward flow of electrolyte through the gaps between the cathode plate and the anode plates 1) by forcing electrolyte into the tank below the cathode and anode plates and 2) by collecting the electrolyte with a plurality of collector ports disposed across the tank between the anode plates.

In accordance with another aspect of the present invention, there is provided a method of electrowinning copper as described above, further comprising the step of:

(d) causing the electrolyte to flow through the gaps between the cathode plate and the anode plates at a uniform, average velocity of between 0.50 in./min. and 10.0 in./min.

It is an object of the present invention to provide an electrowinning cell having improved operating characteristics.

It is another object of the present invention to provide an electrowinning cell as described above for electrowinning copper.

Another object of the present invention is to provide an electrowinning cell as described above having improved electrolyte flow between the electrode plates.

It is an object of the present invention to provide an electrolyte circulation system for an electrodeposition cell.

It is another object of the present invention to provide an electrolyte circulation system as described above that produces uniform flow of electrolyte past electrode plates in an electrowinning cell.

A still further object of the present invention is to provide an electrowinning cell and electrolyte circulation system as described above that improves the product quality and productivity of the electrowinning cell.

These and other objects and advantages will become apparent from the following description of a preferred embodiment of the invention taken with the accompanying drawings and the appended claims.

BRIEF DESCRIPTION OF THE DRAWINGS

The invention may take physical form in certain parts and arrangement of parts, preferred embodiments of which will be described in detail in the specification and illustrated in the accompanying drawings which form a part hereof, and wherein.

DETAILED DESCRIPTION OF THE INVENTION

Figure 1:
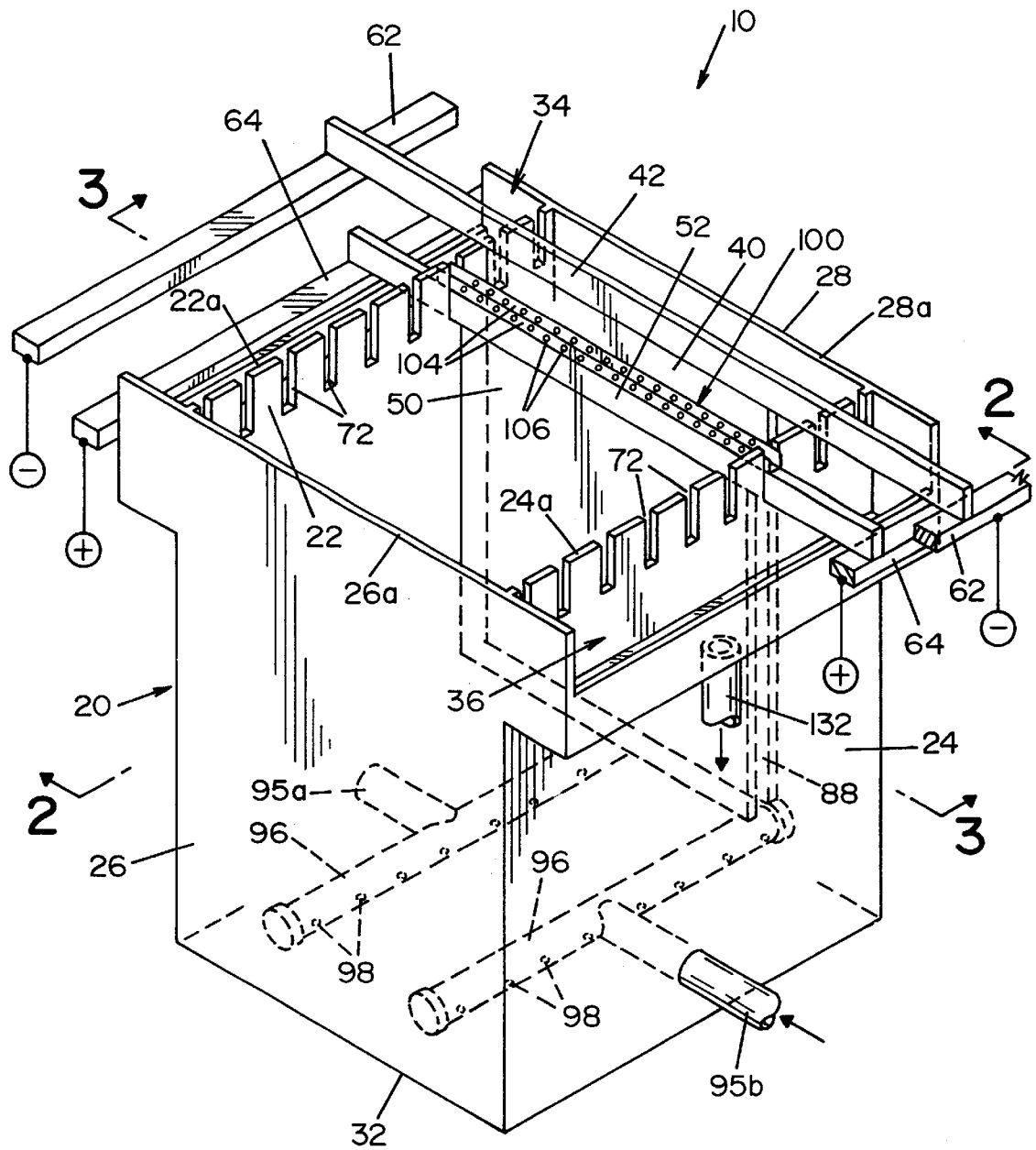
FIG. 1 is a perspective view of an electrowinning cell having parallel electrode plates therein, and having an electrolyte flow system according to a preferred embodiment of the present invention.

Referring now to the drawings wherein the showings are for the purpose of illustrating the preferred embodiment of the invention only, and not for the purpose of limiting same, FIG. 1 is a perspective view of an electrowinning cell 10 for extracting metal from an electrolytic solution containing ions of the metal. (Throughout the specification, the terms "electrolytic solution" and "electrolyte" are used synonymously). The present invention will be described with respect to an electrowinning cell for producing copper, although it will be appreciated that cell 10 may be also used for forming other metals, such as, by way of example and not limitation, zinc or manganese.

Figure 5:
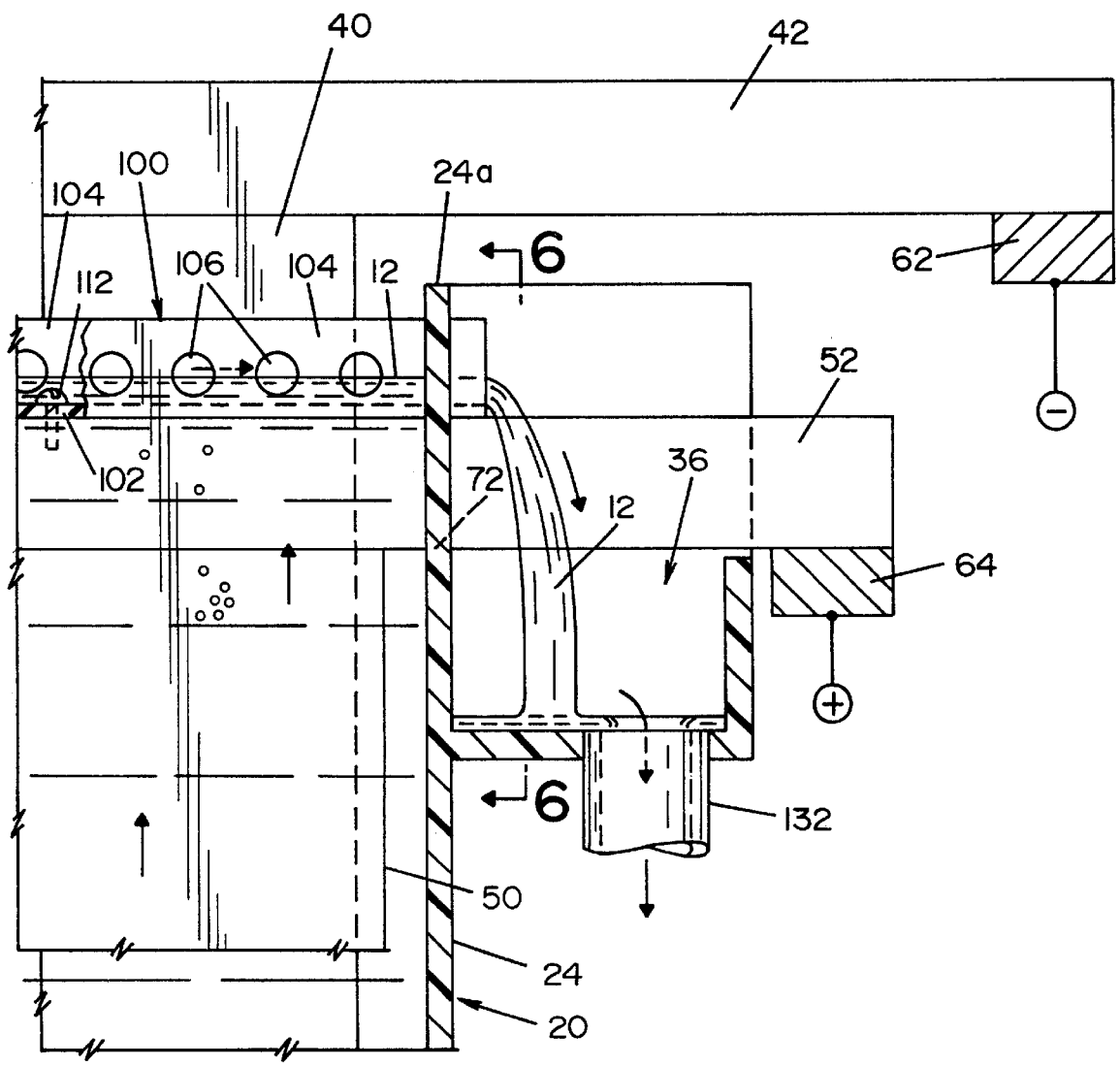
FIG. 5 is an enlarged sectional view of an electrolyte collection system according to the present invention.
Figure 9:
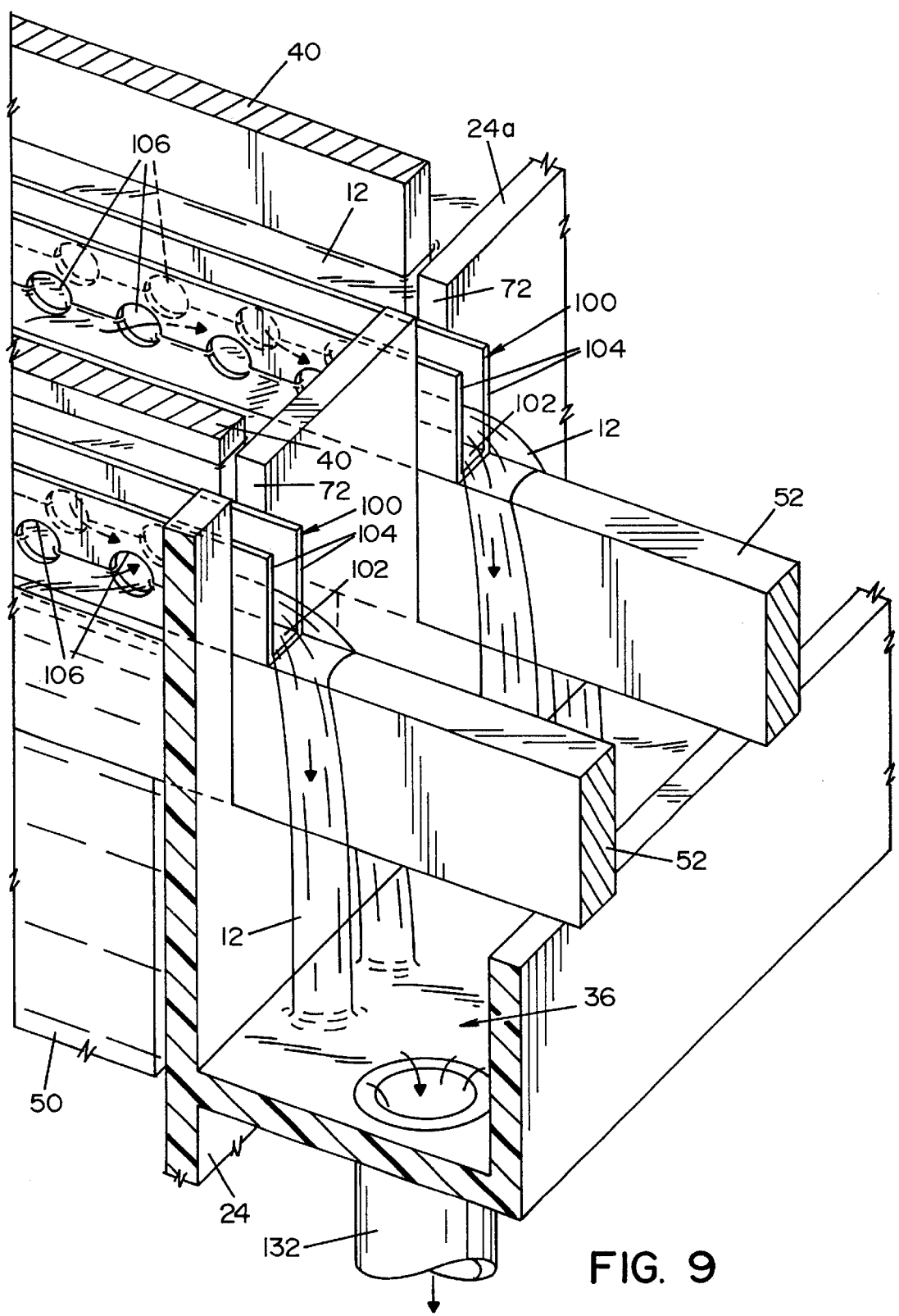
FIG. 9 is an enlarged, perspective view of the ends of several anode plates where they project through a tank wall, showing the flow pattern of the electrolyte from the electrowinning cell to an electrolyte collection trough.

Broadly stated, cell 10 is comprised of a tank 20 containing an electrolytic solution 12. In the embodiment shown, tank 20 is generally rectangular in shape and includes vertical side walls 22, 24, end walls 26, 28 and a bottom wall 32. Troughs 34, 36 are formed along the outer, upper edges 22a, 24a of side walls 22, 24, respectively, as best seen in FIGS. 1, 5 and 9. Troughs 34, 36 are part of an electrolyte circulation system that shall be described in greater detail below. Tanks of electrowinning cells are typically formed of a corrosion-resistant and acid-resistant material, such as plastic or inert metal. Tank 20 and troughs 34, 36 are preferably formed of a plastic material. Tank 20 is dimensioned to receive a plurality of side-by-side, parallel electrodes, designated 40, 50, in side-by-side, spaced-apart relationship. Electrode 40 is a cathode plate, and electrode 50 is an anode plate.

Cathode plate 40 is generally a flat, rectangular plate having a straight hanger bar 42 extending along the upper edge thereof. Hanger bar 42 is preferably welded to cathode plate 40 as is conventionally known. Hanger bar 42 has a length greater than the width of tank 20, wherein the ends of hanger bar 42 extend beyond the periphery of tank 20, as seen in FIG. 1.

Figure 8:
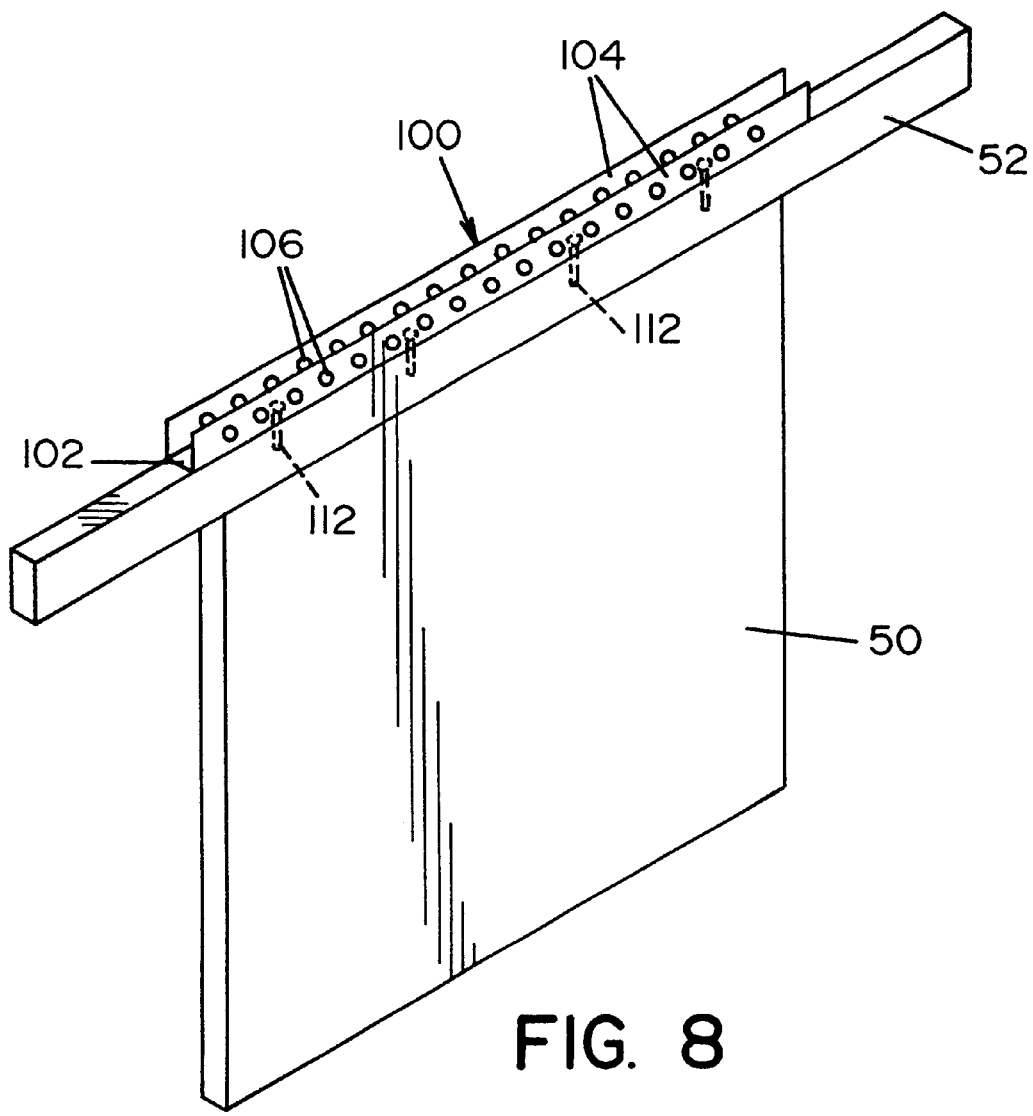
FIG. 8 is a perspective view of an anode electrode plate, showing an electrolyte collector along the upper edge thereof.

Anode plate 50, best seen in FIG. 8, is a flat, rectangular plate having a hanger bar 52 extending along the upper edge thereof. Hanger bar 52 is dimensioned to extend beyond troughs 34, 36 of tank 20, as best seen in FIG. 1. Hanger bars 42, 52 are formed of a conductive metal as is conventionally known.

Cathode plates 40 and anode plates 50 are dimensioned to be supported within tank 20 in side-by-side, alternating relationship. To this end, structural supports 62, 64 are disposed outside tank 20 to support cathode plates 40 and anode plates 50 on their respective hanger bars 42, 52.

Supports 62, 64 are only partially shown in the drawings. In the embodiment shown, supports 62, 64 are conductive rails, i.e., copper bus bars, that in addition to supporting cathode plates 40 and anode plates 50, form conductive pathways to energize cathode plates 40 and anode plates 50, as schematically illustrated in FIGS. 1–5.

Figure 3:
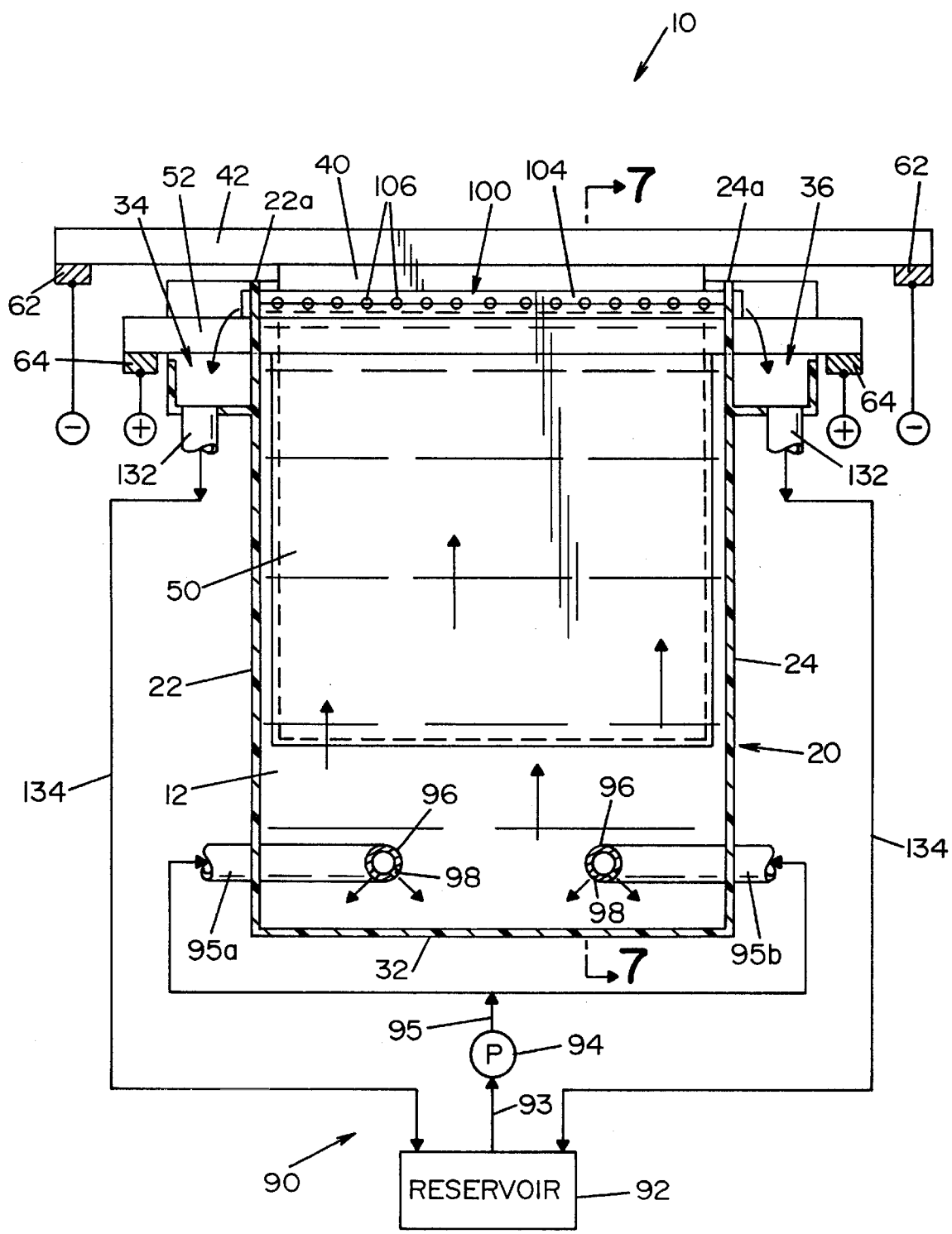
FIG. 3 is a sectional view taken along lines 3—3 of FIG. 1.
Figure 4:
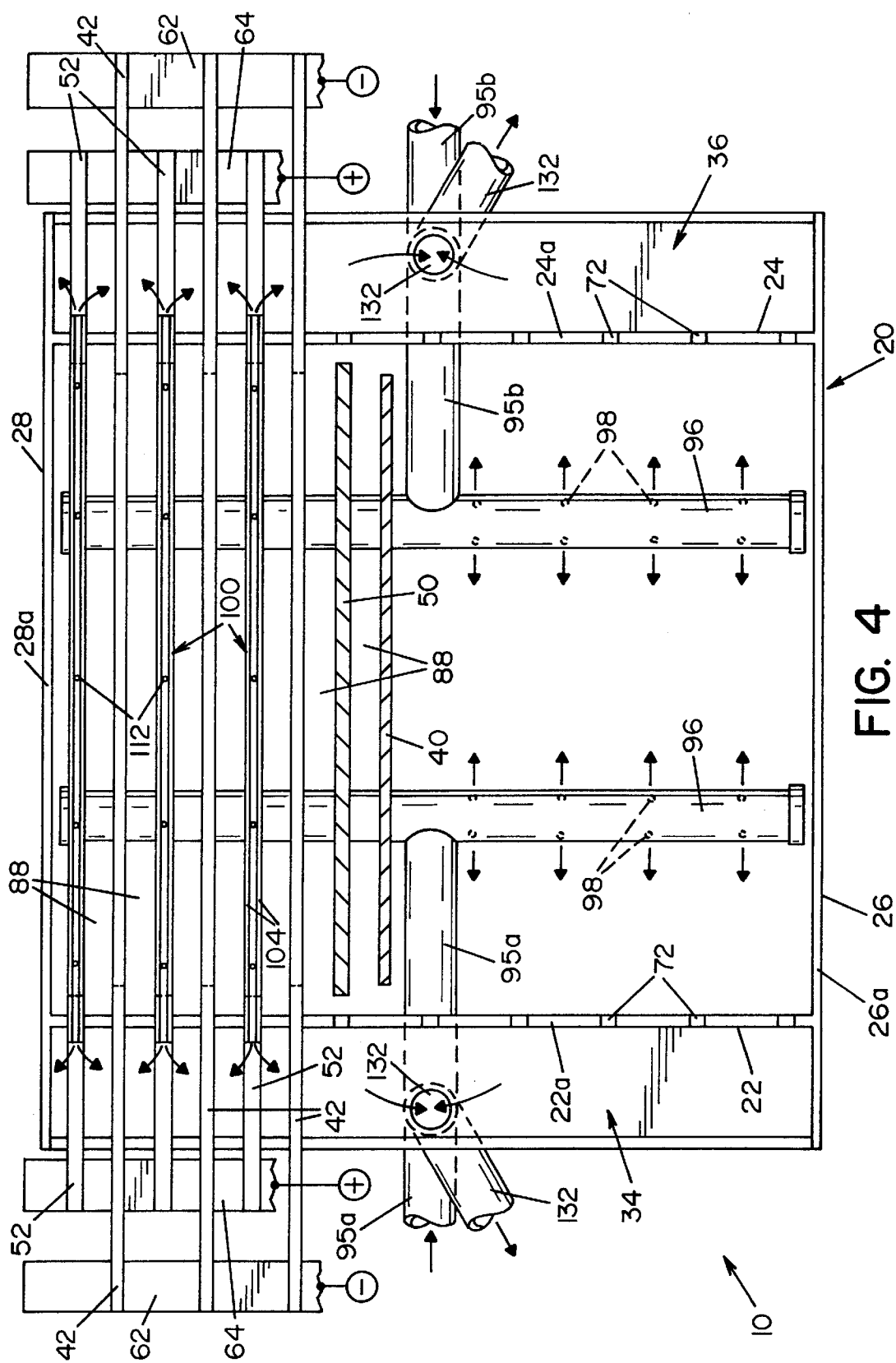
FIG. 4 is a top plan view of the electrowinning cell shown in FIG. 1.

As best seen in FIGS. 1 and 3, supports 62 are dispersed relative to tank 20 such that cathode plates 40 are supported within tank 20 with a lower portion of each cathode plate 40 disposed within tank 20, and with hanger bar 42 and an upper portion of cathode plate 40 disposed above the upper edges 22a, 24a of side walls 22, 24 of tank 20. Supports 64 for anode plates 50 are disposed relative to tank 20 such that each anode plate 50 and its respective hanger bar 52, are disposed below upper edges 22a, 24a of side walls 22, 24 of tank 20.

Figure 2:
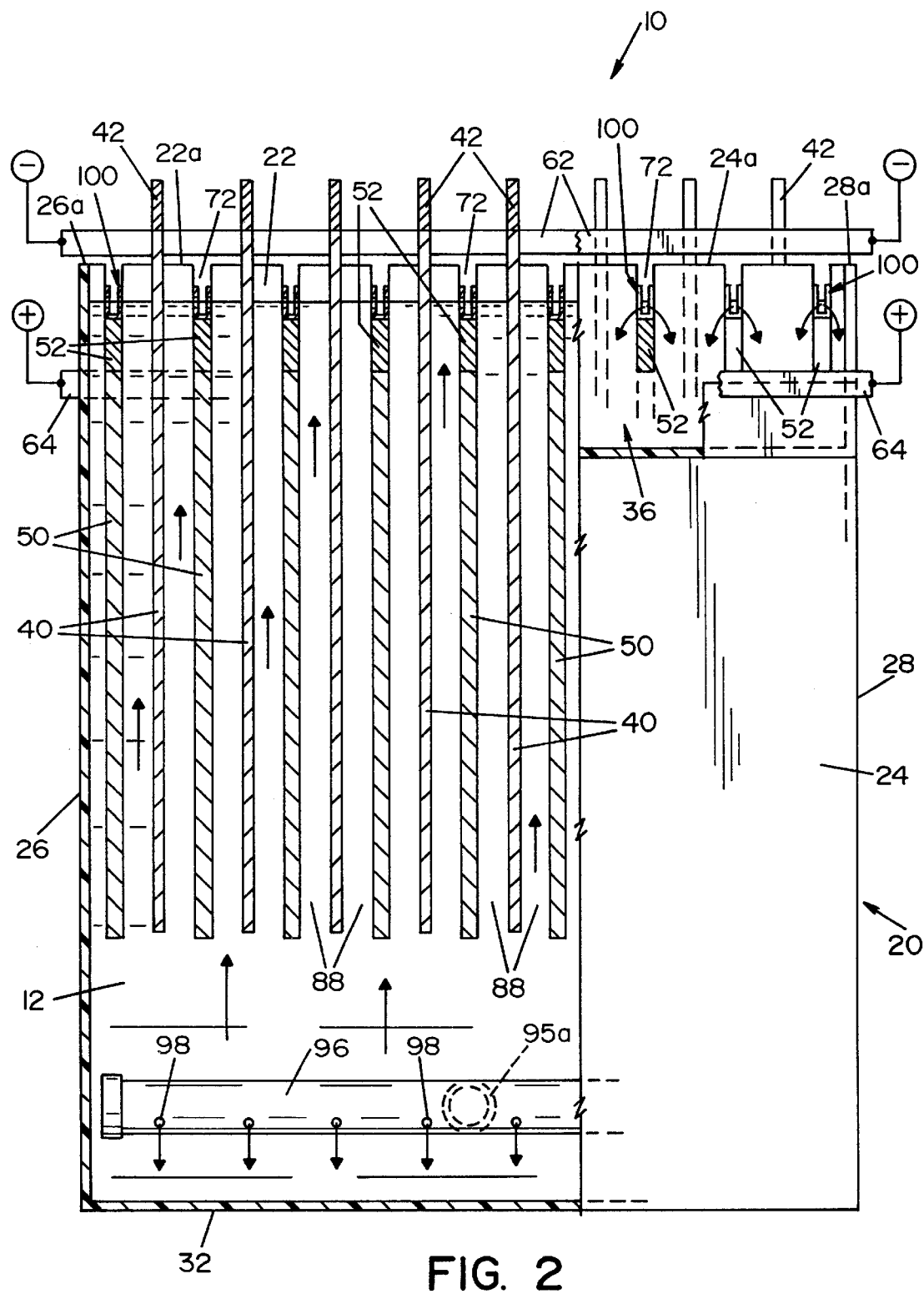
FIG. 2 is a sectional view taken along lines 2—2 of FIG. 1.
Figure 12:
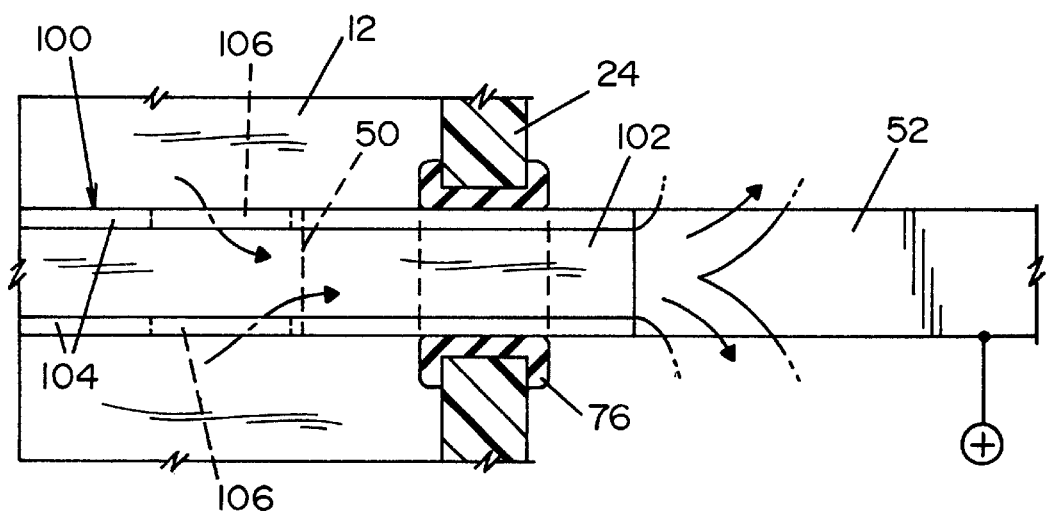
FIG. 12 is a top plan view of one end of an anode plate showing a seal arrangement for sealing the end of the anode and the electrolyte collector to a tank wall.

To allow anode plates 50 to be positioned below upper edges 22a, 24a of side walls 22, 24, spaced-apart, vertical slots 72 are formed in upper edges 22a, 24a of side walls 22, 24, as best seen in FIGS. 1 and 2. Slots 72 are dimensioned to receive anode hanger bars 52. The distal ends of hanger bars 52 extend over troughs 34, 36 when anode plates 50 are in position within tank 20, as best seen in FIG. 3. Slots 72 are dimensioned such that the upper edge of hanger bar 52 is disposed a pre-determined distance below upper edges 22$_a$, 24a of side walls 22, 24. In the embodiment shown in FIGS. 1–9, the width of slots 72 is dimensioned to match closely the width of hanger bar 52, such that hanger bar 52 fits snuggly therein. In an alternate embodiment, a seal 76, formed of a resilient, elastomeric material that is chemically inert to electrolyte 12, may be provided between hanger bar 52 and side walls 22, 24 to form a fluid-tight seal therebetween, as illustrated in FIG. 12.

In the embodiment shown, cathode plates 40 and anode plates 50 are arranged in side-by-side, alternating fashion, wherein a cathode plate 40 is disposed between two anode plates, 50. Guide rails (not shown) are disposed within tank 20 extending between end walls 26, 28 to receive the lower edges of cathode plates 40 and anode plates 50, respectively. The guide rails are provided to vertically align cathode plates 40 and anode plates 50 within tank 20. Slotted, vertical guides (not shown) may also be provided along the inner surface of side walls 22, 24 to assist in vertically aligning cathode plates 40 and anode plates 50 relative to each other. A generally uniform interelectrode gap 88 is defined between adjacent cathode plates 40 and anode plates 50.

Figure 7:
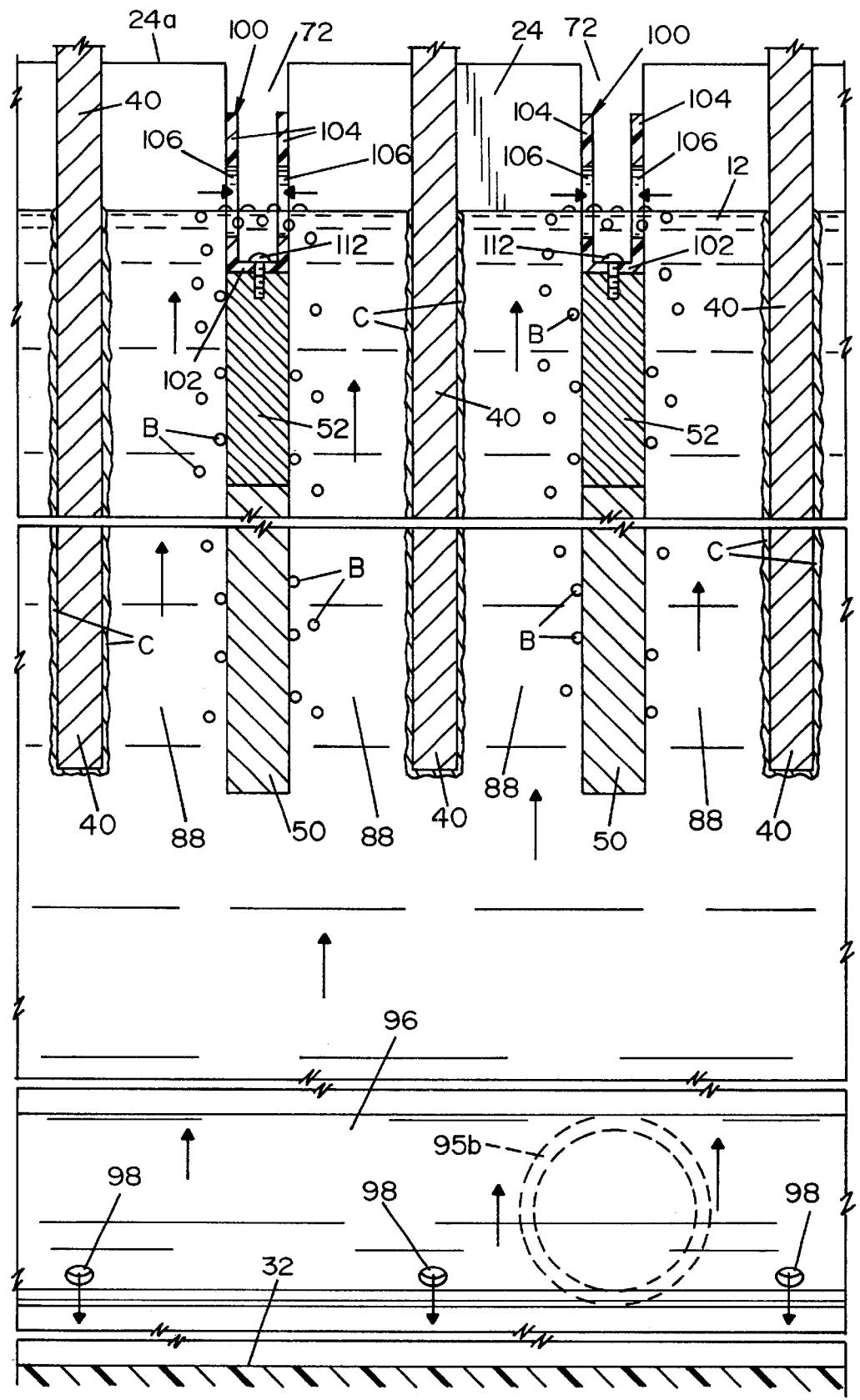
FIG. 7 is an enlarged, broken view taken along lines 7—7 of FIG. 3.

An electrolyte circulation system 90 is provided to circulate electrolyte 12 through tank 20. Circulation system 90 is comprised of a reservoir 92 and a pump 94, that are both schematically illustrated in FIG. 3. Reservoir 92 provides a supply of electrolyte 12 having metal ions therein for use in electrowinning cell 10. Reservoir 92 is essentially a replenishing tank, wherein spent or metal-ion-depleted electrolyte 12 is replenished with metal ions. Such a "metal ion replenishing tank" is conventionally known in the art, and therefore shall not be described in detail. Reservoir 92 provides a source of electrolyte 12 to pump 94 via line 93. In the embodiment shown, a feed line 95 from the pump is split into two feed lines 95a, 95b. Feed lines 95a, 95b extend through side walls 22, 24 into tank 20. Feed lines 95a, 95b each terminate in a manifold pipe 96, best seen in FIG. 2. Manifold pipes 96 are disposed above bottom wall 32 of tank 20 and below the lower ends of cathode plates 40 and anode plates 50. Manifold pipes 96 have downward facing apertures 98 formed therein, as best seen in FIGS. 2 and 7.

Figure 6:
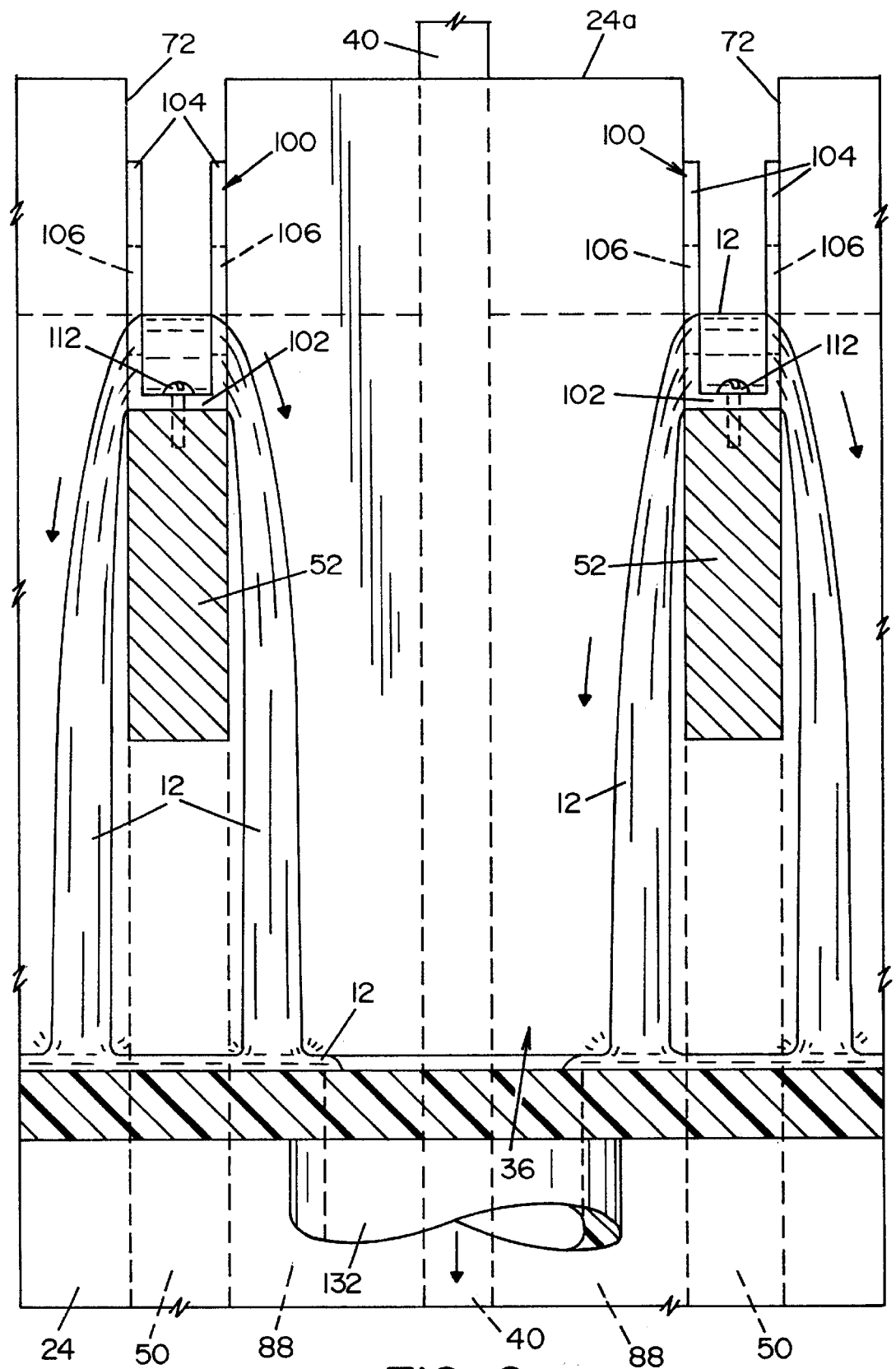
FIG. 6 is an enlarged, sectional view taken along lines 6—6 of FIG. 5.

A plurality of electrolyte collectors 100 extend across the upper end of tank 20. In the embodiment shown, collectors 100 are U-shaped channels that are mounted along the upper edge of hanger bar 52. The U-shaped collectors 100 preferably have a flat, bottom wall 102 and parallel, upward extending side walls 104. Collectors 100 are preferably formed of a non-conductive, plastic material. Collectors 100 may be secured to hanger bars 52 by a number of different fastening means, but in the preferred embodiment, collectors 100 are secured to hanger bars 52 with nonmetallic, threaded fasteners 112 that are threaded into openings in the upper surface of hanger bars 52, as best seen in FIG. 6.

As best seen in FIG. 5, collectors 100 are dimensioned such that a portion of the distal ends of each collector 100 extends beyond side walls 22, 24 of tank 20. Collectors 100 are dimensioned to have a width closely matching the width of the associated anode hanger bar 52, such that sides 104 of collectors 100 fit snuggly within slot 72 in side walls 22, 24 of tank 20, as best seen in FIG. 6, and form a relatively fluid-tight joint therewith.

A plurality of spaced-apart, aligned apertures 106 are formed in each side wall 104 of each U-shaped collector 100. In the embodiment shown, apertures 106 are cylindrical in shape and are disposed about half way up each side wall 104 of collectors 100. Apertures 106 are aligned in rows, and each row of apertures 106 is preferably parallel to apertures 106 in other collectors 100 to lie in a common plane.

Collectors 100 are adapted to collect electrolyte 12 from tank 20 and to direct electrolyte 12 to troughs 34, 36. Each trough 34, 36 contains one or more drainpipes 132 that are connected to an electrolyte return line 134 to return electrolyte 12 to reservoir 92.

Referring to the operation of electrowinning cell 10, the present invention shall be described with respect to electrowinning copper. Tank 20 is filled with electrolyte 12 comprised of sulfuric acid ($H_2SO_4$) containing copper ions. Cathode plates 40 are negatively charged and anode plates 50 are positively charged to produce an electric field across the interelectrode gaps 88 defined between adjacent cathode plates 40 and anode plates 50. Pump 94 causes electrolyte 12 to be forced into tank 20 through manifold pipes 96. Apertures 98 in manifold pipes 96 direct electrolyte 12 toward the bottom of tank 20, as indicated by the arrows in FIG. 2. From the bottom of tank 20, electrolyte 12 flows generally vertically through gaps 88 between cathode plates 40 and anode plates 50.

In accordance with one aspect of the present invention, pump 94 is preferably operated to create flow of electrolyte 12 through said electrode gaps 88 between cathode plates 40 and anode plates 50 at a velocity between 0.50 in./min. and 10.0 in./min. In another embodiment, the velocity of electrolyte 12 through gaps 88 is between 2 in./min. and 7 in./min. Preferably, the velocity of electrolyte 12 through gap 88 is between 4 in./min. and 6 in./min.

The level of electrolyte 12 in tank 20 is established by apertures 106 in collectors 100. Because upper edges 22a, 24a of side walls 22, 24 and upper edges 26a, 28a of end walls 26, 28 of tank 20 are above apertures 106, once electrolyte 12 reaches the level of apertures 106, electrolyte 12 flows into U-shaped collectors 100 and is carried through collectors 100 to troughs 34, 36, as illustrated in FIG. 9. Electrolyte 12 in troughs 34, 36 is returned to reservoir 92 via lines 134.

As indicated above, anode hanger bar 52 and collector 100 preferably Form a tight fit with slots 72 in side walls 22, 24 to minimize leakage of electrolyte 12 from tank 20 through said joints. However, as will be appreciated, minor leakage of electrolyte will not significantly affect the flow of electrolyte 12 through apertures 106 of collectors 100, and any leakage through side walls 22, 24 will, of course, be collected by troughs 34, 36 and returned to reservoir 92 via drain pipes 132 and return lines 134. If a fluid-tight joint is desired, a seal 76, as shown in FIG. 12, may be employed.

Figure 10:
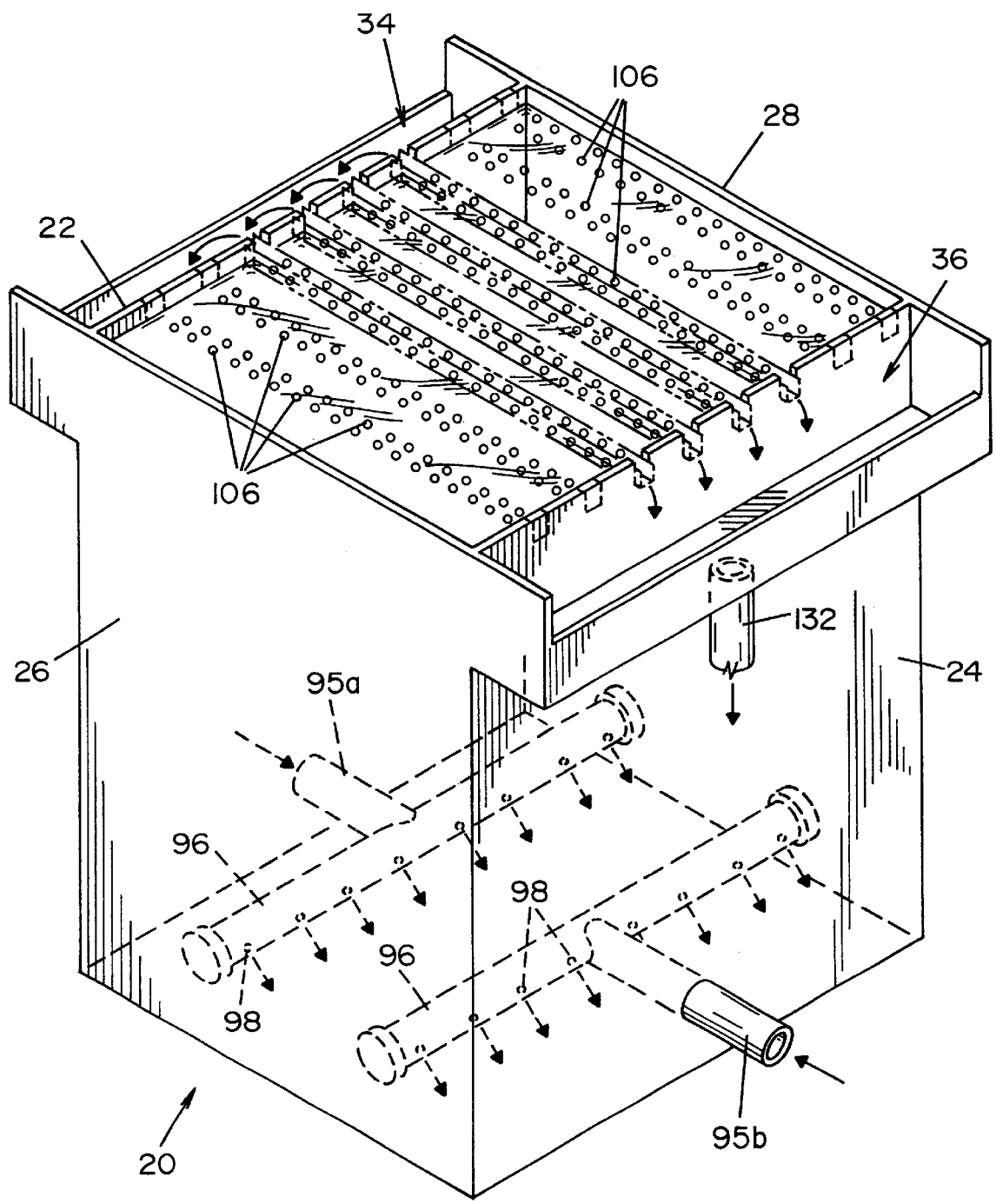
FIG. 10 is a schematic view showing the electrolyte inlet ports and a grid of electrolyte outlet ports formed by an electrolyte circulation system according to the present invention.

The plurality of collectors 100 extending across the upper edge of tank 20 basically forms a grid-like arrangement of apertures 106 that essentially provide a plurality of outlet ports or drain ports for electrolyte 12 that span the upper surface of tank 20. FIG. 10 schematically shows the plurality of apertures 106 in collectors 100 and how such apertures 106 basically provide a grid-like pattern of electrolyte outlet ports across the upper end of tank 20. Because the electrolyte outlet ports, i.e., apertures 106, are directly above the electrolyte inlet ports, i.e., apertures 98 in manifold pipes 96, electrolyte 12 is forced into the bottom of tank 20 and follows a generally vertical flow path upward through gap 88 between cathode plates 40 and anode plates 50, as indicated by arrows in FIG. 7. As a result, there is a continuous flow of new, replenished electrolyte 12 from reservoir 92 flowing between cathode plates 40 and anode plates 50, where the electrodeposition process occurs. This type of flow not only provides a metal-ion-rich electrolyte 12 between cathode plates 40 and anode plates 50, but also assists in forcing away gas bubbles B that are typically formed on the surface of anode plates 50 during the electrodeposition process.

FIG. 7 schematically illustrates cell 10 in operation. The arrows indicate the direction of flow of electrolyte 12. Copper, designated "C" in the Figure, is shown being plated onto cathode plates 40. Gas bubbles, designated "B" in the drawing, are illustrated as forming on the surface of anode plates 50. Gas bubbles B act as insulators and reduce the electric field potential between cathode plates 40 and anode plates 50. Using the flow of electrolyte 12 to force away such bubbles B further enhances the electrodeposition process. By providing the electrolyte outlet ports, i.e., apertures 106 in collectors 100 between adjacent cathode plates 40, spent electrolyte 12, i.e., electrolyte having a reduced metal ion concentration as a result of the electrodeposition process, is forced out of tank 20 into collectors 100 by fresh electrolyte 12 being forced up from below.

The present invention thus provides an electrowinning cell 10, and an electrolyte circulation system for such cell, that provides more uniform, consistent flow of electrolyte 12 through gaps 88 between adjacent cathode plates 40 and anode plates 50. The more uniform, consistent flow of electrolyte facilitates more uniform, consistent metal deposition.

Another advantage of the present invention is that the rate of flow of electrolyte 12 through gaps 88 can be controlled. Since the flow through gap 88 is dependent upon the flow of electrolyte 12 into tank 20 by controlling the output of pump 94, variable flow rates of electrolyte 12 can be established in gap 88 to optimize a desired deposition rate. Typically, most conventional copper electrowinning cells that have side or edge overflow configurations operate at an electrolyte flow rate equivalent to about 1.5 gal./min. through a 1 square foot area. This is equivalent to an average fluid velocity through the unit area of about 0.163 ft./min. ($\approx$0.033 in./sec.). In conventional side or edge draining copper electrowinning cells, increasing the flow rate of the electrolyte does not significantly improve the deposition rate of copper. It is believed that such a configuration produces non-uniform flow rates between electrodes and therefore, limits the operating flow rate of the electrolyte because in some areas of such tanks, particularly at the sides, the flow rates of the electrolyte are higher than areas in the upper center of the tank. Such non-uniform flow rates of the electrolyte between the electrodes also produce a non-uniform deposition of electrodeposited metal.

The present invention provides a more uniform and evenly distributed vertical flow of electrolyte 12 past cathode and anode plates 40, 50. Such flow provides better copper deposition rates at conventional flow rates of about 0.05 gal./min./ft.$^2$. Even at higher rates up to about 0.5 gal./min./ft.$^2$, a cell according to the present invention provides increased copper deposition. At flow rates above 0.15 gal./min./ft.$^2$, only slight improvements in copper deposition seem to occur as the flow rate increases.

Figure 11:
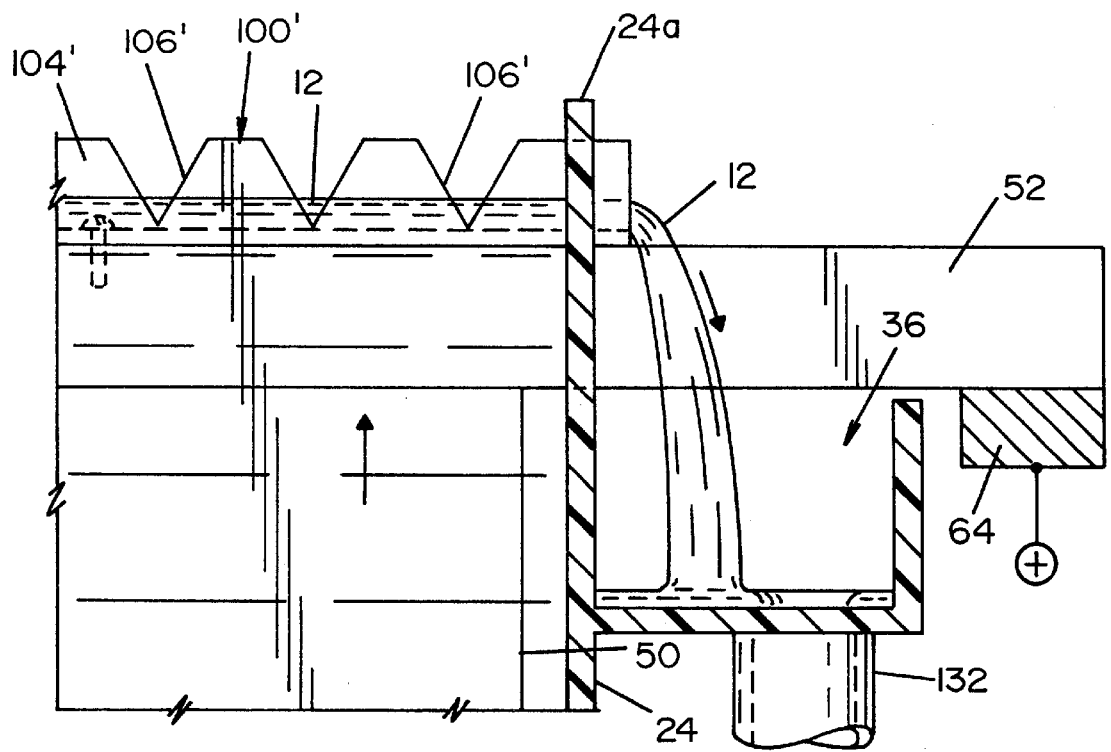
FIG. 11 is an elevational view of an upper corner of an anode plate showing an electrolyte collector according to an alternate embodiment of the present invention.

The foregoing description is a specific embodiment of the present invention. It should be appreciated that this embodiment is described for purposes of illustration only, and that numerous alterations and modifications may be practiced by those skilled in the art without departing from the spirit and scope of the invention. For example, it will be appreciated by those skilled in the art, that other types of collectors 100 may be used to form spaced-apart electrolyte outlet ports across the upper end of tank 20. In this respect, FIG. 11 shows a collector 100' having V-shaped notches 106' formed in side walls 104'. V-shaped notches 106' define the electrolyte outlet ports for collecting electrolyte 12.

Further, the invention has heretofore been described with respect to a copper electrowinning cell, where the copper is deposited onto cathode plates 40 and collectors 100 are disposed along the upper edge of anode plates 50. In other types of electrowinning cells, such as cells for forming manganese, the metal is electrodeposited onto an anode plate. In such cells, collectors would preferably be disposed along the upper edges of the cathode plates.

It will further be appreciated that collectors 100 need not be secured to an upper edge of an electrode plate to provide the grid-like array of electrolyte outlet ports across the upper end of the tank.

It is intended that all such modifications and alterations be included insofar as they come within the scope of the invention as claimed or the equivalents thereof.

What is claimed is:

1. An electrowinning cell, comprised of:
   a tank for holding electrolyte having an opened upper end;
   a plurality of flat, metallic electrode plates disposed within said tank in side-by-side, spaced-apart, parallel relationship, said electrode plates defining a gap between adjacent electrode plates;
   electrolyte circulation system including:
      an inlet manifold disposed below said electrode plates;
      a plurality of spaced-apart collectors extending across said open upper end of said tank, said collectors extending parallel to said electrode plates; and
      a device for continuously pumping electrolyte into said tank through said inlet manifold, wherein said electrolyte pumped into said tank flows upward through said gaps to said collectors, said collectors establishing a level for said electrolyte solution in said tank.

2. An electrowinning cell as defined in claim 1, wherein said electrowinning cell is for electrowinning copper, and said electrode plates include alternating cathode plates and anode plates, a cathode plate being disposed between two anode plates.

3. An electrowinning cell as defined in claim 1, wherein said collector extends across the upper edge of said anode plates.

4. An electrowinning cell as defined in claim 3, wherein said collectors are U-shaped channels having ends that extend beyond sides of said tank.

5. An electrowinning cell as defined in claim 4, wherein said U-shaped channels have side walls with apertures therein, said apertures forming electrolyte outlet ports establishing said level of electrolyte in said tank.

6. An electrowinning cell as defined in claim 1, wherein said device for pumping is a pump controllable to vary the flow of electrolyte into said tank.

7. An electrowinning cell as defined in claim 6, wherein the electrolyte flows through said gap at an average velocity of between 0.05 in./min. and 0.50 in./min.

8. An electrowinning cell, having:
   a tank;
   electrolyte within said tank; and
   a plurality of flat, metallic electrode plates disposed within said tank in side-by-side, spaced-apart, parallel relationship, adjacent electrode plates defining an electrode gap therebetween, the improvement comprising:

an electrolyte feed line for injecting electrolyte into said tank below said lower portions of said electrode plates; and an electrolyte collector grid comprised of a plurality of generally parallel collectors that extend across said tank, said collectors being disposed between said electrode plates and establishing a level of electrolyte in said tank by collecting said electrolyte when said electrolyte reaches said level, said collectors disposed relative to said inlet feed line to collect said electrolyte at spaced-apart locations within said tank and to produce a generally vertical flow of electrolyte through said gaps between said electrode plates.

9. An electrowinning cell as defined in claim 8, wherein said spaced-apart locations are disposed between adjacent electrode plates.

10. An electrowinning cell as defined in claim 9, wherein said collectors extend across the tops of said electrode plates.

11. An electrowinning cell as defined in claim 10, wherein said collectors are conduits extending through a wall of said tank, said conduits directing electrolyte from said spaced-apart locations to a collector trough along the side of said tank.

12. An electrowinning cell as defined in claim 11, wherein said conduits are U-shaped channels having side walls with apertures formed therein, said apertures defining the level of electrolyte in said tank by collecting electrolyte through said apertures and directing said electrolyte from said tank to said trough.

13. An electrowinning cell as defined in claim 9, further comprising an electrolyte circulation system having:

a reservoir for replenishing said electrolyte with metal atoms;

a pump for conveying electrolyte from said reservoir to said tank; and at least one trough connected to said reservoir for receiving electrolyte from said collectors and returning said electrolyte to said reservoir.

14. An electrowinning cell as defined in claim 13, wherein said pump has a variable output to vary said flow of electrolyte through said gaps between said electrode plates.

15. An electrowinning cell, having:

a tank having an opened upper end defined by a tank edge;

electrolyte within said tank;

a plurality of flat, metallic electrode plates disposed within said tank in side-by-side, spaced-apart, parallel relationship, adjacent electrode plates defining an electrode gap therebetween; the improvement comprising:

an injector manifold at the bottom of said tank for feeding electrolyte into said tank at locations below said electrode plates; and a collector grid comprised of a plurality of collectors having outlet ports that define an upper level of said electrolyte by collecting said electrolyte from said tank, said ports disposed in spaced-apart relationship within said open upper end defined by said tank edge, said collector grid and said injector creating a flow of electrolyte upward between said plates as said solution flows from said manifold locations below said plates to said ports.

16. An electrowinning cell as defined in claim 15, wherein said collector grid is comprised of a plurality of elongated fluid conduits extending across said open upper end of said tank.

17. An electrowinning cell as defined in claim 16, wherein said conduits are generally parallel to each other and are disposed between said electrode plates.

18. An electrowinning cell as defined in claim 17, wherein said conduits are U-shaped channels and said ports are openings in the sides of said channel.

19. An electrowinning cell as defined in claim 18, wherein said openings are circular.

20. An electrowinning cell as defined in claim 18, wherein said apertures are U-shaped notches.

21. An electrowinning cell as defined in claim 18, wherein said electrolyte flows through said electrode gap between said electrode plates at an average velocity between 0.50 in./min. and 10.0 in./min.

22. An electrowinning cell, having:

a tank having an opened upper end;

an electrolyte within said tank; and a plurality of spaced-apart electrode plates within said tank; the improvement comprising:

a plurality of electrolyte inlet ports disposed within said tank below said electrode plates, said inlet ports connectable to a source of pressurized electrolyte for forcing electrolyte into said tank; and a plurality of electrolyte outlet ports at a predetermined level in said tank spaced across said opened upper end of said tank, said outlet parts disposed above said inlet ports to collect electrolyte in said tank when said electrolyte reaches, said predetermined level.

23. An electrowinning cell as defined in claim 22, wherein said electrolyte outlet ports are openings in collectors that span across said openings in said tank.

24. An electrowinning cell as defined in claim 23, wherein said collectors are attached to electrode plates.

25. An electrowinning cell as defined in claim 22, wherein said outlet ports are disposed between electrode plates.

26. A method of electrowinning copper, comprising the steps of:

(a) vertically orienting a cathode plate between two, spaced-apart, vertical anode plates within a tank, said cathode plate and said anode plates being essentially parallel to each other with a uniform gap defined between said cathode plate and each anode plate;

(b) negatively energizing said cathode plate and positively energizing said anode plates; and (c) causing a vertical, upward flow of electrolyte through said gaps between said cathode plate and said anode plates 1) by forcing electrolyte into said tank below said cathode and anode plates and 2) by collecting said electrolyte with a plurality of collector ports disposed across said tank between said anode plates.

27. A method of electrowinning copper as defined in claim 26, further comprising the step of:

(d) causing said electrolyte to flow through said gaps between said cathode plate and said anode plates at a uniform, average velocity of between 0.50 in./min. and 10.0 in./min.

28. A method of electrowinning copper as defined in claim 27, wherein said velocity of said electrolyte is between 0.50 in./min. and 10.0 in./min.

* * * * *